(12) United States Patent
Zivcec et al.

(10) Patent No.: US 11,104,031 B2
(45) Date of Patent: Aug. 31, 2021

(54) METHOD FOR LAYERED PRODUCTION OF A GREEN BODY FROM POWDERY OR PASTE-LIKE MATERIAL HAVING CUTTING ELEMENTS ARRANGED IN A DEFINED MANNER

(71) Applicant: Hilti Aktiengesellschaft, Schaan (LI)

(72) Inventors: Maria Zivcec, Buchs (CH); Robert Spring, Fruemsen (CH); Roland Schneider, Schlins (AT)

(73) Assignee: Hilti Aktiengesellschaft, Schaan (LI)

( * ) Notice: Subject to any disclaimer, the term of this patent is extended or adjusted under 35 U.S.C. 154(b) by 204 days.

(21) Appl. No.: 16/471,621

(22) PCT Filed: Nov. 29, 2017

(86) PCT No.: PCT/EP2017/080772
§ 371 (c)(1),
(2) Date: Jun. 20, 2019

(87) PCT Pub. No.: WO2018/114255
PCT Pub. Date: Jun. 28, 2018

(65) Prior Publication Data
US 2019/0381693 A1    Dec. 19, 2019

(30) Foreign Application Priority Data
Dec. 22, 2016   (EP) .................................... 16206208

(51) Int. Cl.
*B28B 1/00*    (2006.01)
*B22F 10/10*   (2021.01)
(Continued)

(52) U.S. Cl.
CPC .............. *B28B 1/001* (2013.01); *B22F 10/10* (2021.01); *B28B 1/008* (2013.01); *B29C 64/165* (2017.08);
(Continued)

(58) Field of Classification Search
CPC ..... B28B 1/001; B29C 64/165; B29C 64/106; B29C 64/188; B22F 10/10; B22F 10/14
See application file for complete search history.

(56) References Cited

U.S. PATENT DOCUMENTS 5,433,280 A    7/1995   Smith et al.

FOREIGN PATENT DOCUMENTS

| EP | 0 452 618 A1 | 10/1991 |
| ES | 2366722 | 10/2011 |
| JP | 2000190086 A | 7/2000 |

OTHER PUBLICATIONS

International Search Report of PCT/EP2017/080772, dated May 2, 2018.

*Primary Examiner* — Mary Lynn F Theisen
(74) *Attorney, Agent, or Firm* — Davidson, Davidson & Kappel, LLC

(57) ABSTRACT

A method for the layered production of a green body from powdery or paste-like material, including cutting elements based on three-dimensional data of the green body, the green body being segmented in a building direction into N (N≥2) consecutive cylindrical cross-sectional areas made up of a two-dimensional cross-sectional surface perpendicular to the building direction and a layer thickness in parallel to the building direction, including the method steps: the cross-sectional areas of the green body are each divided into material areas, and setting areas, in which the cutting elements are situated; the material areas in the building direction are applied to a building plane situated perpendicularly to the building direction, until at least one cavity formed by one setting area or by multiple consecutive setting areas in the building direction, has the necessary insert height for placing the cutting elements; and at least one cutting element is placed into the cavities having the necessary insert height for placing the cutting elements.

13 Claims, 8 Drawing Sheets

(51) Int. Cl.
*B29C 64/165* (2017.01)
*B29C 64/188* (2017.01)
*B33Y 10/00* (2015.01)
*B33Y 50/00* (2015.01)

(52) U.S. Cl.
CPC ............ B29C 64/188 (2017.08); *B33Y 10/00* (2014.12); *B33Y 50/00* (2014.12); *C04B 2235/6026* (2013.01)

METHOD FOR LAYERED PRODUCTION OF A GREEN BODY FROM POWDERY OR PASTE-LIKE MATERIAL HAVING CUTTING ELEMENTS ARRANGED IN A DEFINED MANNER

The present invention relates to a method for the layered production of a green body from powdery or paste-like material having cutting elements arranged in a.

BACKGROUND

Abrasive processing tools, such as drill bits, saw blades, cutting wheels or grinding wheels, include processing segments which are fastened to a tubular or disk-shaped base body. Depending on the processing method of the abrasive processing tool, the processing segments are referred to as drilling segments, sawing segments, cutting segments or grinding segments and combined under the term "processing segments". The processing segments are constructed from a powdery material and cutting elements in the form of hard material particles. A distinction is made between processing segments having statistically distributed hard material particles and processing segments having hard material particles arranged in a defined manner. In processing segments having statistically distributed hard material particles, the powdery material and the hard material particles are mixed and filled into a suitable tool mold and initially formed into a green body with the aid of cold pressing. In processing segments having hard material particles arranged in a defined manner, the green body is constructed in layers from a powdery material, into which the hard material particles are placed in defined positions. In the case of statistically distributed hard material particles and hard material particles arranged in a defined manner, the green bodies are compressed into usable processing segments by hot pressing and/or sintering.

Processing segments having statistically distributed hard material particles have multiple disadvantages. Since the hard material particles are also situated on the surface of the green bodies, the tool molds needed for cold pressing the green bodies have a high degree of wear. In addition, the distribution of the hard material particles in the green body does not correspond to the optimal distribution for application purposes. The disadvantages of processing segments having statistically distributed hard material particles result in that processing segments having hard material particles arranged in a defined manner are overwhelmingly used for high quality processing tools, despite the higher costs.

EP 0 452 618 A1 describes a known method for the layered production of a green body from a powdery material, including hard material particles situated in defined positions in the powdery material. The known method is based on three-dimensional data of the green body and includes the following method steps:

The green body is segmented in a building direction into N, N≥2 consecutive cylindrical cross-sectional areas, each cross-sectional area being formed from a two-dimensional cross-sectional surface perpendicular to the building direction and a layer thickness in parallel to the building direction.

N, N≥2 powder layers of the powdery material are applied to a building plane, which is situated perpendicularly to the building direction.

The hard material particles are situated in the defined positions in the powdery material.

The hard material particles are taken up with the aid of a suction plate and positioned over the layer structure. By reducing the suction force or with the aid of a short compressed air blast, the hard material particles detach from the suction plate and are placed into the upper powder layer of the layer structure. The compressed air blast may be only so strong that the powdery material is not displaced and the hard material particles are situated in the provided defined positions of the distribution. Another disadvantage is that the hard material particles are situated only loosely on or in the upper powder layer. Upon applying and distributing the next powder layer of the powdery material with the aid of an application tool in the form of a roller, a scraper or a brush, the hard material particles may be displaced from their defined positions by the application tool, and the accuracy may thus be reduced.

SUMMARY OF THE INVENTION

It is an object of the present invention to increase the accuracy with which the provided distribution of the cutting elements in the green body is formed in the layered production of green bodies, which are compressed, in particular, into processing segments for abrasive processing tools. The provided distribution of the cutting elements in the green body is also to be retained during the further layered production of the green body. In addition, protective measures are to be taken, if possible as early as the production of the green body, which prevent a chemical bonding between the cutting elements and the powdery or paste-like material during a subsequent compression process, for example with the aid of hot pressing or sintering.

In the method mentioned at the outset for the layered production of a green body from a powdery or paste-like material, including cutting elements arranged in a defined manner.

The present invention provides a method for the layered production of a green body from a powdery or paste-like material, including cutting elements arranged in a defined manner, is based on three-dimensional data of the green body, the green body being segmented in a building direction into N, N≥2 consecutive cylindrical cross-sectional areas formed from a two-dimensional cross-sectional surface perpendicular to the building direction and a layer thickness in parallel to the building direction and including the steps according to the present invention:

The cross-sectional areas of the green body are each divided into material areas manufactured from the powdery or paste-like material, and setting areas in which the cutting elements are arranged;

The material areas of one cross-sectional area or the material areas of multiple consecutive cross-sectional areas in the building direction are applied to a building plane, which is situated perpendicularly to the building direction, until at least one cavity formed by one setting area or multiple consecutive setting areas in the building direction has a necessary insert height for arranging the cutting elements; and At least one cutting element is situated in the cavities having the necessary insert height for situating the cutting elements.

The method according to the present invention for the layered production of a green body is based on three-dimensional data of the green body, which is segmented in the building direction into N, N≥2 cylindrical cross-sectional areas, each cross-sectional area being constructed as a straight cylindrical section from an arbitrary two-dimensional cross-sectional surface perpendicular to the building direction and a layer thickness in parallel to the building direction. The layer thicknesses of the cross-sectional areas may be identical or different, identical layer thicknesses being usually used. The smaller the layer thicknesses, the more precisely may a desired three-dimensional distribution of the cutting elements be created in the green body, the building time needed to manufacture the green body, however, being increased. The cross-sectional areas are made up of material areas manufactured from the powdery or paste-like material and of setting areas for the cutting elements, setting areas being present only in cross-sectional areas having cutting elements. The cutting elements are situated in cavities, which are formed from the setting areas during the layered construction of the green body. The cavities may be made up of one setting area or multiple consecutive setting areas in the building direction.

In the method according to the present invention for the layered production of a green body, multiple cavities are created in the green body during the layered construction, into which the cutting elements are situated. All layered construction methods which produce a green body from powdery or paste-like material are suitable for the layered construction; this includes, for example 3D printing or binder jetting. At least one cutting element is situated in the cavities having the necessary insert height. One cutting element, multiple identical cutting elements or different cutting elements may be situated in a cavity. The cross-sectional shape of the cavities and the insert height of the cavities may be adapted to the geometry of the cutting elements. The smaller the clearance between the cavity and the cutting element, the more precisely may the position of the cutting element in the green body be achieved. The necessary insert height of the cavities is dependent, among other things, on the type and size of the cutting elements. In addition, the necessary insert height of the cavities for identical cutting elements may be different within the green body, and it may depend on the spatial placement of the cutting elements. A three-dimensional distribution of the cutting elements in the green body may be created with the aid of the distribution of the cavities in the green body. The smaller the selection of the layer thicknesses of the cross-sectional areas, the more precisely may the distribution of the cutting elements in the green body be adapted to an optimal distribution of cutting elements for application purposes, the building time necessary for producing the green body, however, increasing.

The method according to the present invention for the layered production of a green body is suitable for powdery materials, which are also referred to as material powder, and paste-like materials, which are also referred to as paste. All materials which are solid in the initial state and are made from loose, i.e. non-bonded, powder particles, are combined under the term "powdery materials". Powdery materials may be made up of a material powder or be composed of a mixture of different material powders. All solid/liquid mixtures made up of a liquid and a high content of finely distributed solids, which are spread-resistant in the initial state, are combined under the term "paste-like materials". Paste-like materials may be characterized by the solid content, the viscosity and/or the chemical composition.

All cutting means for abrasive processing segments are combined under the term "cutting element". This includes, in particular, individual hard material particles (particles of hard materials), composite parts made up of multiple hard material particles and coated or encapsulated hard material particles. Hard materials are characterized by a special hardness. Hard materials may be divided into natural and synthetic hard materials, on the one hand, and into metallic and nonmetallic hard materials, on the other hand. The natural hard materials include, among other things, natural diamonds, corundum and other hard minerals, and the synthetic hard materials include, among other things, synthetic diamonds, high-melting carbides, borides, nitrides and silicides. The metallic hard materials include, among other things, the high-melting carbides, borides, nitrides and silicides of the transition metals of the fourth through the sixth group of the periodic system, and the nonmetallic hard materials include, among other things, diamond, corundum, other hard minerals, silicon carbide and boron carbide.

In a first variant of the method, the necessary insert height of the cavities for situating the cutting elements is smaller than a minimum diameter of the cutting elements. In cutting elements designed in the shape of individual hard material particles, mixtures of hard material particles are usually used, which are characterized by a minimum diameter $D_{min}$ and a maximum diameter $D_{max}$. In mixtures of hard material particles, 95% of the hard material particles are larger than the minimum diameter $D_{min}$. In the case of an insert height which is smaller than the minimum diameter of the cutting elements, the cutting elements are not situated completely within the cavities after placement.

The first variant is suitable for processing segments for abrasive processing tools, in particular on an upper side of the processing segments. A side of the processing segments facing the substrate or workpiece to be processed is referred to as the upper side, and a side of the processing segments which is connected to the tubular or disk-shaped base body of an abrasive processing tool is referred to as the underside. The abrasive processing takes place across exposed cutting elements on the upper side of the processing segments. During the processing with the aid of an abrasive processing tool, the matrix (powdery or paste-like material after hot pressing and/or sintering) of the processing segments is removed, and the lower-lying cutting elements are exposed on the upper side of the processing segments. In known abrasive processing tools, the processing segments must generally be sharpened on the upper side to expose the cutting elements. The sharpening of the processing segments may be omitted if the first variant is used. During the layer construction, another material layer is applied after the placement of the cutting elements into the cavities. The layer thickness of the material layer may be used to determine whether and to what extent the cutting elements protrude on the upper side.

In an alternative second variant of the method, the necessary insert height of the cavities for situating the cutting elements is larger than a maximum diameter of the cutting elements. For mixtures of hard material particles, 95% of the hard material particles are usually smaller than the maximum diameter $D_{max}$. In the case of an insert height of the cavities which is greater than the maximum diameter of the cutting elements, all cutting elements are practically situated completely within the cavities. The second variant has the advantage that the cutting elements are placed securely into the cavities, and the risk of cutting elements being displaced when another material layer is applied is further reduced. In addition, after the placement of the cutting elements, the cavities may be filled with special material, which almost completely surrounds the cutting elements. The use of special material is useful if the layered green body is subjected to a subsequent processing with the aid of hot pressing and/or sintering for compression purposes.

In one preferred refinement of the method, the cavities having the necessary insert height are filled with special material in addition to the cutting elements. The use of special material is useful if the layered green body is subjected to a subsequent processing with the aid of hot pressing and/or sintering for compression purposes. In processing segments for abrasive processing tools, the cutting elements may become damaged during the hot pressing and/or sintering, due to the powdery or paste-like material used. The special material is to form a chemical compound with the powdery or paste-like material, on the one hand, and mechanically bind the cutting elements, on the other hand; a chemical bonding of the cutting elements with the powdery or paste-like material is undesirable. The properties of the special material are adapted to the powdery or paste-like material and the cutting elements. The special material may have a powdery or paste-like design, a powdery special material being advantageously used in the case of a powdery material, and a paste-like special material being advantageously used in the case of a paste-like material. Cobalt powder or bronze powder, for example, are suitable as the special materials for hard material particles in the form of diamond particles.

In a first variant, the filling of the cavities having the necessary insert height is carried out with special material in one method step. The special material may be filled into the cavities before the cutting elements are placed or after the cutting elements are placed. The one-part filling method using special material has the advantage over a two-part filling method, in which the filling with special material is carried out in two method steps, that the necessary building time is shorter.

The filling of the cavities with special material particularly preferably takes place before the cutting elements are placed. The cavities having the necessary insert height are filled with special material before the cutting elements are placed. The cutting elements are placed into the special material and, if possible, pressed so far into the special material that the cutting elements are completely surrounded by special material.

Alternatively, the filling of the cavities with special material is carried out after the cutting elements are placed. The cavities having the necessary insert height are filled with special material after the cutting elements are placed. The variant of filling the special material after the cutting elements are placed may be used if the cutting elements are to be placed with great precision in the green body. The cutting elements may be fastened in the cavities with the aid of an adhesive. The risk of the position and orientation of the cutting elements changing during the filling of the cavities with special material is significantly reduced by the adhesive. It could be disadvantageous that the cutting elements are not completely surrounded by the special material, and the risk of a chemical bonding between the cutting elements and the powdery material is greater than in the variant in which the filling of the cavities with special material takes place before the cutting elements are placed.

In an alternative second variant, the filling of the cavities having the necessary insert height with special material is carried out in two method steps, a first part of the special material being filled into the cavities before the cutting elements are placed, the cutting elements being placed into the first part of the special material, and a second part of the special material being filled into the cavities after the cutting elements are placed. The two-part filling method with special material has the advantage that the cutting elements are completely surrounded by special material, and a chemical bonding between the cutting elements and the powdery or paste-like material is completely prevented; however, the necessary building time is approximately twice as long as in the one-part filling method.

In one preferred refinement of the method, the cutting elements are at least partially fastened in the cavities with the aid of an adhesive. The properties of the special adhesive used are adapted to the powdery or paste-like material and to the cutting elements. The use of an adhesive has the advantage that the cutting elements are placed securely in the cavities, and the risk of the cutting elements being displaced when another material layer is applied is further reduced. Cutting elements, such as individual hard material particles, have an orientation and should be placed in the right orientation in the cavity. Cutting elements which are fastened in the cavities by adhesive retain their defined positions and orientations in the green body, which is constructed with greater accuracy.

The cavities having the necessary insert height are particularly preferably filled with the adhesive before the cutting elements are placed. The adhesive is filled into the cavities having the necessary insert height and the cutting elements are placed into the adhesive as long as the adhesive is not yet cured. After the curing process of the adhesive, the cavity may be filled with a special material, or the layered construction of the green body may be continued.

Alternatively, the cutting elements are at least partially wetted with the adhesive before the cutting elements are placed in the cavities. The cutting elements wetted with the adhesive are placed into the cavities having the necessary insert height with the aid of a placing device, as long as the adhesive is not yet cured. After the curing process of the adhesive, the cutting elements are fastened in the desired position in the green body and the layered construction of the green body may be continued. Alternatively, the cavity may be filled with special material before the layer construction of the green body is continued.

BRIEF DESCRIPTION OF THE DRAWINGS

Exemplary embodiments of the present invention are described below on the basis of the drawing. The latter is not necessarily intended to represent the exemplary embodiments true to scale but rather the drawing is presented in a schematic and/or slightly distorted form where useful for the purpose of explanation. It should be taken into account that a variety of modifications and changes relating to the form and detail of a specific embodiment may be undertaken without deviating from the general idea of the present invention. The general idea of the present invention is not limited to the exact form or the detail of the preferred specific embodiment illustrated and described below, nor is it limited to an object which would be limited in comparison to the object claimed in the claims. In given design areas, values within the specified limits are also to be disclosed as limiting values and be able to be arbitrarily used and claimed. For the sake of simplicity, the same reference numerals are used below for identical or similar parts or for parts having identical or similar functions.

DETAILED DESCRIPTION

Figure 1:
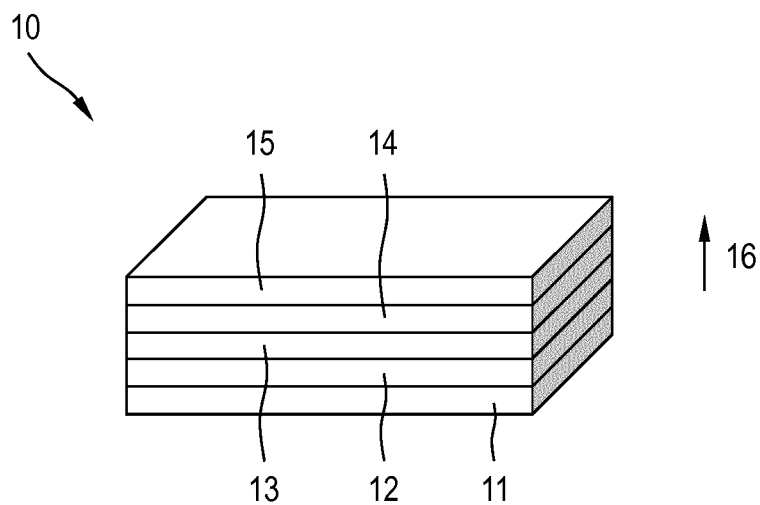
FIG. 1 shows a first green body, which is manufactured from five cylindrical cross-sectional areas situated one above the other in a building direction with the aid of the method according to the present invention for layered production.

FIG. 1 shows a green body 10 designed as a cuboid, which is manufactured with the aid of the method according to the present invention for the layered production of a green body from a powdery or paste-like material, including cutting elements arranged in a defined manner, and which is referred to below as first green body 10. First green body 10 is manufactured in a layer structure from five cylindrical cross-sectional areas 11, 12, 13, 14, 15 situated one above the other, which are stacked on top of each other in a building direction 16. Cylindrical cross-sectional areas 11 through 15 have a layer thickness $d_i$, i=1 through 5 in parallel to building direction 16 and a cross-sectional surface perpendicular to building direction 16. Layer thicknesses $d_i$, i=1 through 5 may be uniform, or individual cross-sectional areas 11 through 15 may have different layer thicknesses.

Figure 2A:
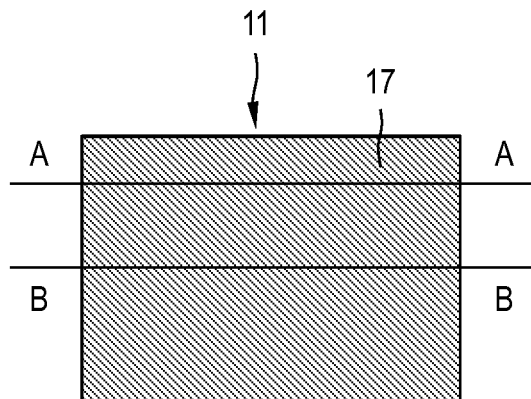
FIGS. 2A through 2E show the five cross-sectional areas of the first green body from FIG. 1, which are made up of a cross-sectional surface perpendicular to the building direction and a layer thickness in parallel to the building direction.
Figure 2B:
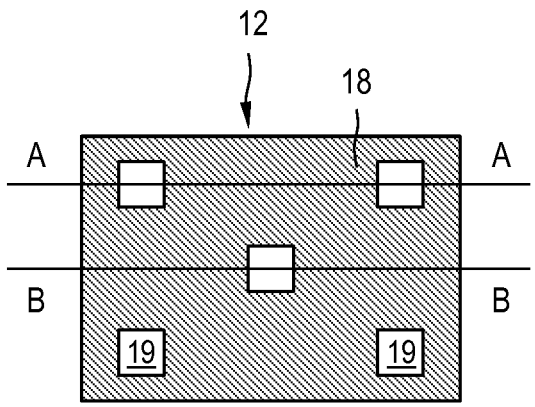
Figure 2C:
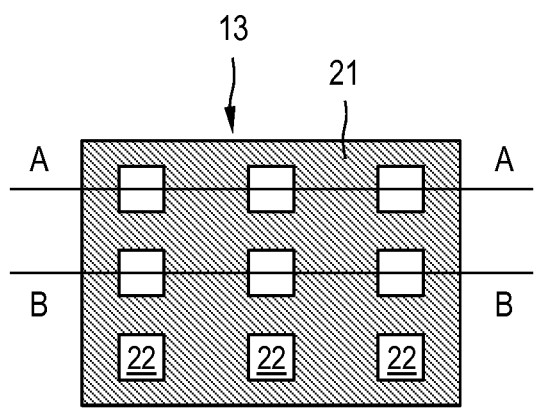
Figure 2D:
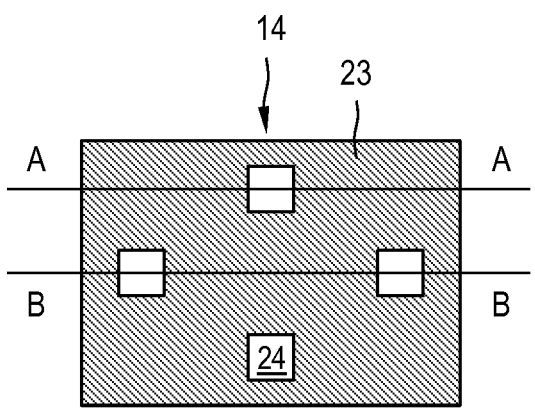
Figure 2E:
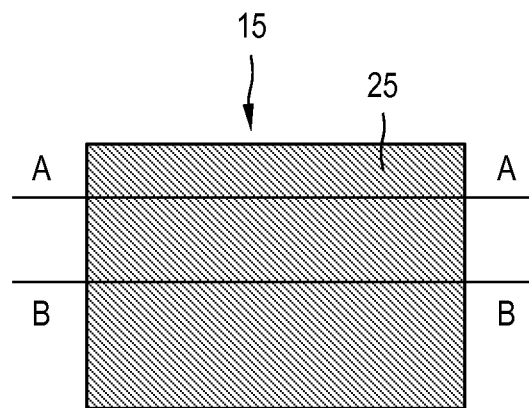

To be able to manufacture first green body 10 in the layer structure, cuboid 10 is segmented in building direction 16 into five cylindrical cross-sectional areas 11 through 15, which are illustrated in FIGS. 2A through 2E. FIG. 2A shows first cross-sectional area 11, FIG. 2B shows second cross-sectional area 12, FIG. 2C shows third cross-sectional area 13, FIG. 2D shows fourth cross-sectional area 14, and FIG. 2E shows fifth cross-sectional area 15. Each cross-sectional area 11 through 15 of first green body 10 includes one or multiple material areas, which are manufactured from powdery or paste-like material and may have one or multiple setting areas. The setting areas form cavities for cutting elements, which are to be placed in cuboid 10. The cavities may be made up of one setting area or multiple consecutive setting areas in the building direction.

To distinguish between the material areas and the setting areas, the material areas of the ith cross-sectional area are referred to as ith material areas, and the setting areas of the ith cross-sectional area are referred to as ith setting areas. First cross-sectional area 11 includes a first material area 17, second cross-sectional area 12 includes a second material area 18 and five setting areas 19, third cross-sectional area 13 includes a third material area 21 and nine third setting areas 22, fourth cross-sectional area 14 includes a fourth material area 23 and four fourth setting areas 24, and fifth cross-sectional area 15 includes a fifth material area 25.

Figure 3A:
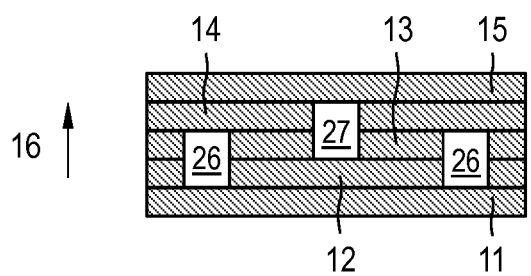
FIGS. 3A, 3B show a first and a second cross section of the first green body from FIG. 1 in parallel to the building direction along section planes A-A in FIGS. 2A through 2E (FIG. 3A) and along section planes B-B in FIGS. 2A through 2E (FIG. 3B)
Figure 3B:
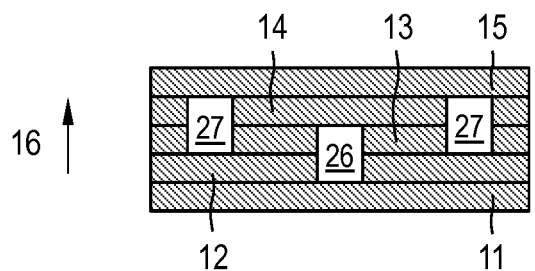

FIGS. 3A, 3B show a first and a second cross section of first green body 10 from FIG. 1 in parallel to building direction 16 along section planes A-A in FIGS. 2A through 2E (FIG. 3A) and along section planes B-B in FIGS. 2A through 2E (FIG. 3B). Five cylindrical cross-sectional areas 11 through 15 of first green body 10 are situated one above the other in building direction 16.

During the layered construction of first green body 10, nine cavities are formed, into which cutting elements are placed. The nine cavities may be divided into a first group of five first cavities 26 and a second group of four second cavities 27. First cavities 26 are situated in second and third cross-sectional areas 12, 13 and are formed by second and third setting areas 19, 22 situated one above the other, second cavities 27 are situated in third and fourth cross-sectional areas 13, 14 and are formed by third and fourth setting areas 22, 24 situated one above the other. FIG. 3A shows two first cavities 26 and one second cavity 27, and FIG. 3B shows one first cavity 26 and two second cavities 27.

In the exemplary embodiment of first green body 10, first and second cavities 26, 27 have the same cross-sectional shape and the same insert height. Alternatively, first cavities 26 may have a first cross-sectional shape and a first insert height, and second cavities 27 may have a second cross-sectional shape and a second insert height which are different from each other. Different cross-sectional shapes and/or different insert heights for the first and second cavities are useful if different first and second cutting elements are situated in the cavities.

Figure 4A:
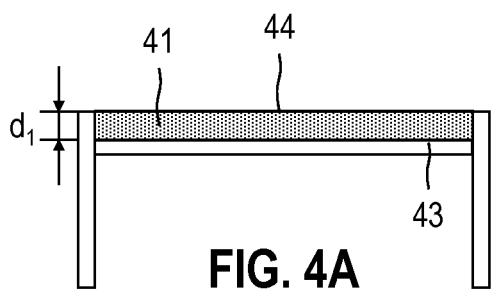
FIGS. 4A through 4T show the consecutive method steps of the method according to the present invention for the layered production of the first green body from a powdery material, including cutting elements arranged in a defined manner.
Figure 4B:
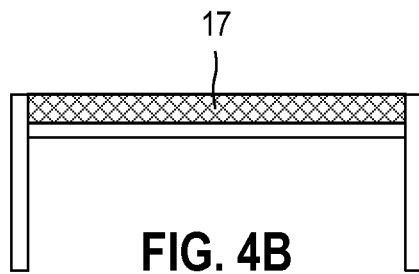
Figure 4C:
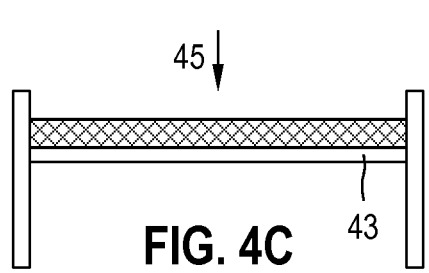
Figure 4D:
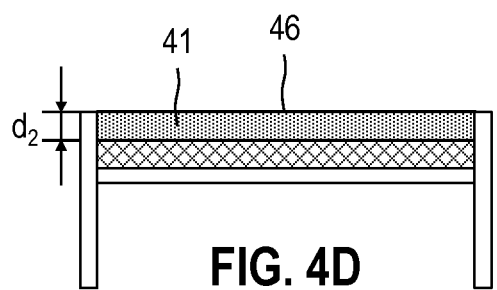
Figure 4E:
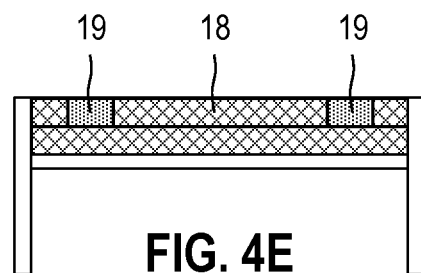
Figure 4F:
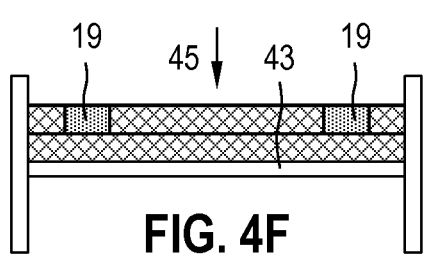
Figure 4G:
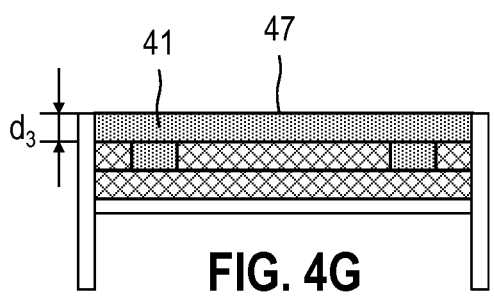
Figure 4H:
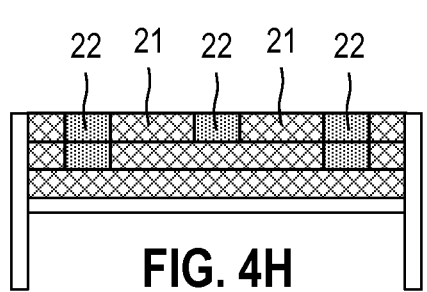
Figure 4I:
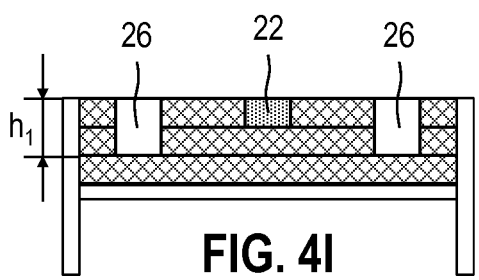
Figure 4J:
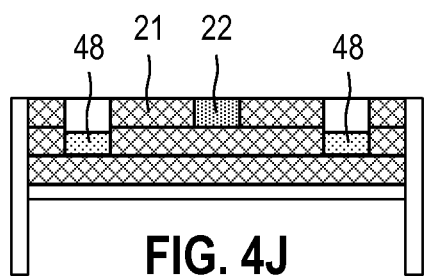
Figure 4K:
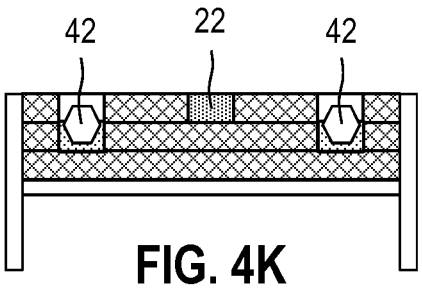
Figure 4L:
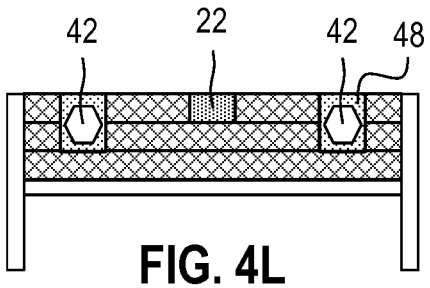
Figure 4M:
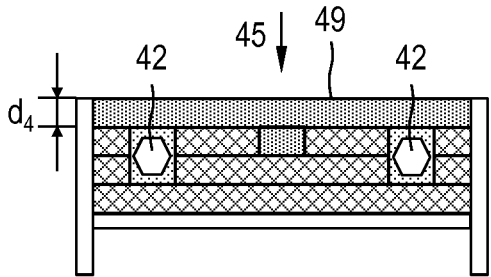
Figure 4N:
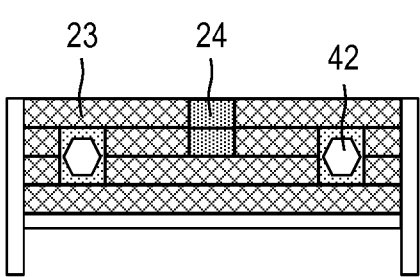
Figure 4O:
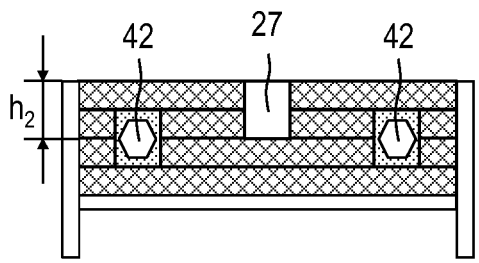
Figure 4P:
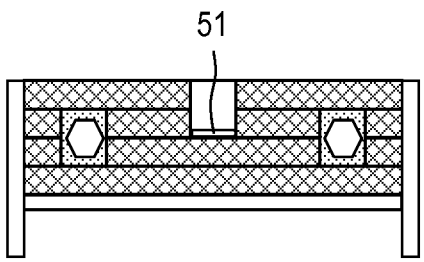
Figure 4Q:
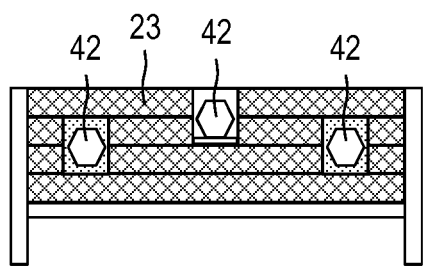
Figure 4R:
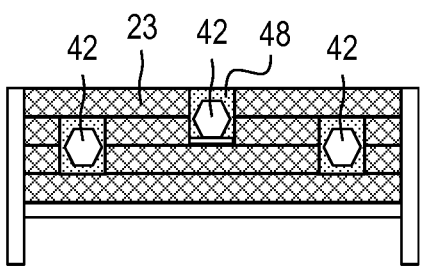
Figure 4S:
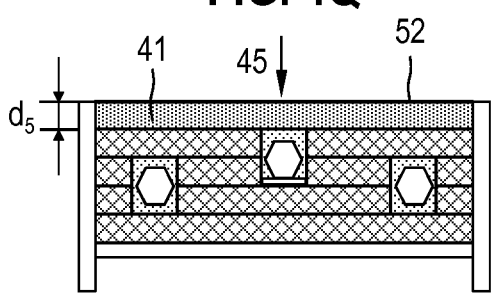
Figure 4T:
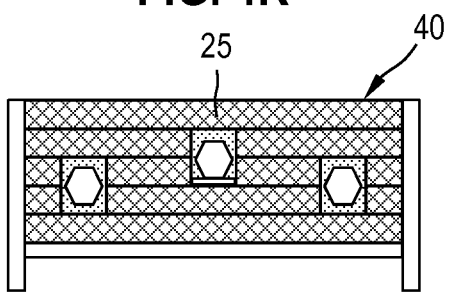

FIGS. 4A through 4T show the consecutive method steps of the method according to the present invention for the layered production of first green body 10 of FIG. 1 from powdery material 41, including cutting elements 42 situated in a defined manner. First green body 10 is manufactured from powdery material 41 and cutting elements 42, which are designed as individual hard material particles 42. Hard material particles 42 originate from a mixture of hard material particles, which are characterized by a minimum diameter $D_{min}$ and a maximum diameter $D_{max}$, 95% of the hard material particles being larger than minimum diameter $D_{min}$ and smaller than maximum diameter $D_{max}$.

First green body 10 is manufactured in layers with the aid of a device, which includes a height-adjustable building plane 43, a powder feed unit and a print head. A first powder layer 44 of powdery material 41 having first layer thickness $d_1$ is applied with the aid of the powder feed unit (FIG. 4A). The print head applies a first adhesive layer in first material area 17, which binds the loose particles of first powder layer 44 in first material area 17 (FIG. 4B). Building plane 43 is lowered by second layer thickness $d_2$ in an adjusting direction 45 in parallel to building direction 16 (FIG. 4C), and a second powder layer 46 of powdery material 41 is applied with the aid of the powder feed unit (FIG. 4D). The print head applies a second adhesive layer in second material area 18, which binds the loose powder particles of second powder layer 46 in second material area 18, the powder particles not being bound in second setting areas 19 (FIG. 4E). Building plane 43 is lowered by third layer thickness $d_3$ in adjusting direction 45 (FIG. 4F), and a third powder layer 47 of powdery material 41 is applied with the aid of the powder feed unit (FIG. 4G). The print head applies a third adhesive layer in third material area 21, which binds the loose powder particles of third powder layer 47 in third material area 21, the powder particles not being bound in third setting areas 22 (FIG. 4H).

The insert height of first cavities 26 is reached after the application of the third powder and adhesive layers, and hard material particles 42 may be situated in first cavities 26. The insert height of first cavities 26 is referred to below as first insert height $h_1$. In the exemplary embodiment, first insert height $h_1$ is greater than maximum diameter $D_{max}$ of hard material particles 42. A first insert height $h_1$, which is greater than maximum diameter $D_{max}$ of hard material particles 42, has the advantage that placed hard material particles 42 are almost completely situated in first cavities 26, and the risk of hard material particles 42 being displaced during the application of another powder layer is further reduced. In addition, hard material particles 42 may be surrounded by a special material, which is different from powdery material 41. Due to the special material, hard material particles 42 may be protected against damage by chemical reactions with powdery material 41 in a subsequent compression process, for example with the aid of hot pressing and/or sintering. Cobalt powder or bronze powder, for example, are suitable as the special materials for hard material particles in the form of diamond particles.

In the illustrated first variant of the method according to the present invention for production of the first green body 10, hard material particles 42 are surrounded by a special material 48. The loose powder particles of powdery material 41 are initially removed from first cavities 26 (FIG. 4I). For this purpose, for example, a first template is placed on the layer structure, which exposes first cavities 26, and the loose powder particles of powdery material 41 are removed from first cavities 26 by extraction with the aid of an extraction unit. After the extraction of powdery material 41, first cavities 26 are partially filled with special material 48 (FIG. 4J), hard material particles 42 are placed into special material 48 (FIG. 4K), and first cavities 26 are subsequently completely filled with special material 48 (FIG. 4L). This variant has the advantage that hard material particles 42 are completely surrounded by special material 48, and the risk of hard material particles 42 becoming damaged by powdery material 41 during the hot pressing and/or sintering being reduced as much as possible.

After first cavities 26 are completely filled with special material 48, the layer construction of first green body 10 continues. Building plane 43 is lowered by fourth layer thickness $d_4$ in adjusting direction 45, and a fourth powder layer 49 of powdery material 41 is applied with the aid of the powder feed unit (FIG. 4M). The print head applies a fourth adhesive layer in fourth material area 23, which binds the loose powder particles of fourth powder layer 49 in fourth material area 23, the powder particles not being bound in fourth setting areas 24 (FIG. 4N).

The insert height of second cavities 27 is reached after the application of the fourth powder and adhesive layers, and hard material particles 42 may be situated in second cavities 27. The insert height of second cavities 27 is referred to below as second insert height $h_2$, second insert height $h_2$ being greater than maximum diameter $D_{max}$ of hard material particles 42. To protect hard material particles 42 situated in second cavities 27 against damage by chemical reactions with powdery material 41, hard material particles 42 of second cavities 27 are embedded into special material 48, like hard material particles 42 of first cavities 26. The filling of second cavities 27 with hard material particles 42 and special material 48 may take place similarly to the two-part filling method of first cavities 26 illustrated in FIGS. 4J, 4K, 4L, in which a first part of special material 48 is filled before hard material particles 42 are placed, and a second part of special material 48 is filled after hard material particles 42 are placed.

To reduce the complexity in the layered production of first green body 10, the two-part filling method of first cavities 26 with special material 48 may be simplified. The alternative provides that hard material particles 42 are placed into the cavities after the extraction of the loose powder particles, and the cavities are filled with special material 48 after hard material particles 42 are placed. The alternative, which is referred to as the one-part filling method, is described on the basis of the example of second cavities 27. During production of green bodies, the one-part or two-part filling method is generally used for special material 48. The one-part filling method is described on the basis of second cavities 27 but may also be used in filling first cavities 26 with special material 48.

The loose powder particles are extracted in the area of second cavities 27 with the aid of the extraction unit (FIG. 4O). To ensure the orientation of hard material particles 42 in second cavities 27, an adhesive 51 may be used, which fastens hard material particles 42. The use of adhesive 51 has the advantage that the orientations and positions of hard material particles 42 are not changed during the application of another material layer or a special material. The properties of the adhesive used are adapted to powdery material 41, hard material particles 42 and/or special material 48. Second cavities 27 are filled with adhesive 51 (FIG. 4P), hard material particles 42 are placed into adhesive 51 (FIG. 4Q) as long as adhesive 51 is not yet cured, and second cavities 27 are filled with special material 48 after adhesive 51 is cured (FIG. 4R). In the described one-part filling method, hard material particles 42 are initially placed in second cavities 27, and second cavities 27 are subsequently filled with special material 48. Alternatively, in the one-part filling method, special material 48 is initially filled into second cavities 27, and hard material particles 42 are subsequently placed into special material 48.

In the exemplary embodiment, first insert height $h_1$ of first cavities 26 and second insert height $h_2$ of second cavities 27 coincide. Alternatively, first and second insert heights $h_1$, $h_2$ may be different. The use of cavities having different insert heights, into which the same type of cutting elements is placed, is advantageously useful for green bodies which are further processed into processing segments for abrasive processing tools. In abrasive processing tools, cutting elements, which process a substrate or a workpiece, must be exposed on the upper side of the processing segments. For this purpose, the processing segments are usually sharpened until cutting elements are exposed on the upper side. The sharpening of the processing segments may be omitted or at least reduced if the cutting elements are placed in the area of the upper side in cavities whose insert height is less than a minimum diameter of the cutting elements. During the layered construction, another material layer is applied after the placement of the cutting elements into the cavities. The layer thickness of the material layer may be used to determine whether and to what extent the cutting elements protrude on the upper side.

After second cavities 27 are filled with special material 48, the layer construction of first green body 10 continues. Building plane 43 is lowered by fifth layer thickness $d_5$ in adjusting direction 45, and a fifth powder layer 52 of powdery material 41 is applied with the aid of the powder feed unit (FIG. 4S). The print head applies a fifth adhesive layer in fifth material area 25, which binds the loose particles of fifth powder layer 52 in fifth material area 25 (FIG. 4T). After the loose powder particles in fifth material area 25 are bound, the layer construction of first green body 10 is concluded. First green body 10 is compressed into a processing segment for an abrasive processing tool in a subsequent compression process, for example by hot pressing and/or sintering.

First green body 10 is manufactured in layers from five material areas 17, 18, 21, 23, 25 having same powdery material 41. Alternatively, the material areas of first green body 10 may be manufactured from different powdery materials 41. In green bodies which are further processed to processing segments for abrasive processing tools, for example, a first powdery material may be used for the first material area, and a second powdery material may be used for the other material areas, the properties of the first powdery material being selected with regard to the connection of the processing segments to the base body, and the properties of the second powdery material being selected with regard to the mechanical connection of the cutting elements. If the processing segments and the base body are to be welded, a weldable first powdery material is selected.

In first green body 10, hard material particles 42 are embedded into special material 48, the filling of first and second cavities 26, 27 taking place in a one-part or two-part filling method. Hard material particles 42 do not have to be embedded into special material 48. Alternatively, hard material particles 42 may be placed into first and second cavities 26, 27 in powdery material 41; the removal of powdery material 41 from cavities 26, 27 and the filling of cavities 26, 27 with special material 48 being omitted in this case. The use of a special material 48 is useful if first green body 10 is subjected to a subsequent processing by hot pressing and/or sintering for compression purposes, and cutting elements 42 become damaged during hot pressing and/or sintering, due to powdery material 41 used. Special material 48 is selected in such a way that it forms a chemical compound with powdery material 41 and mechanically binds cutting elements 42.

Figure 5A:
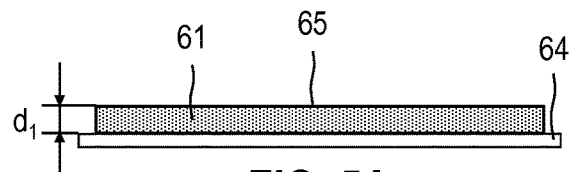
FIGS. 5A through 5O show a second variant of the method according to the present invention for the layered manufacturing of a second green body from a powdery material, including first and second cutting elements arranged in a defined manner.
Figure 5B:
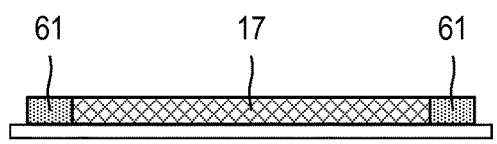
Figure 5C:
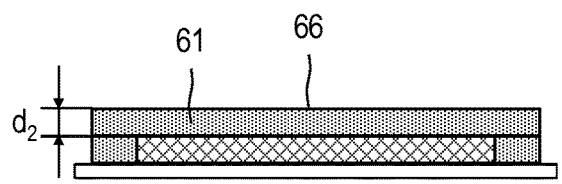
Figure 5D:
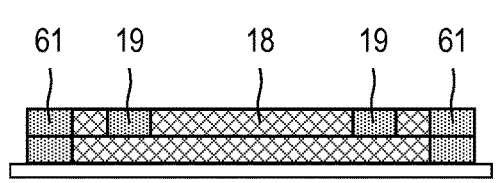
Figure 5E:
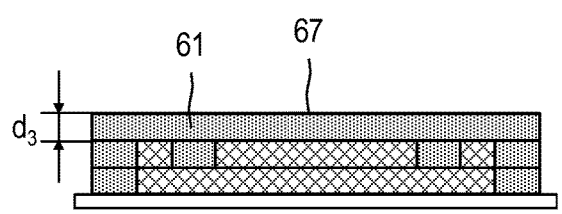
Figure 5F:
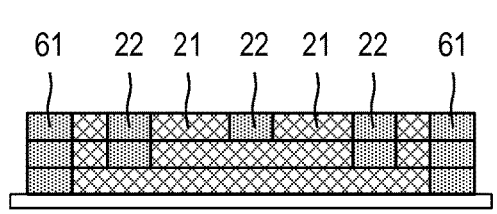
Figure 5G:
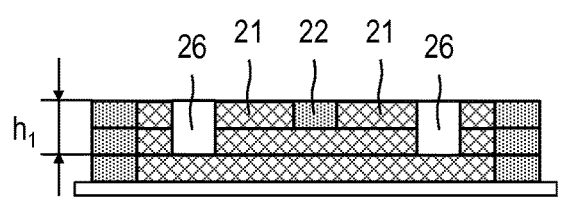
Figure 5H:
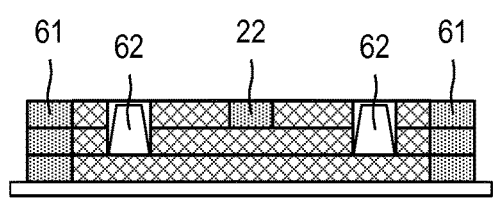
Figure 5I:
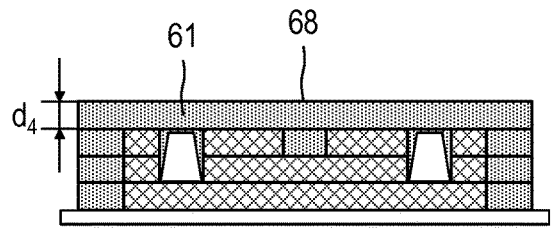
Figure 5J:
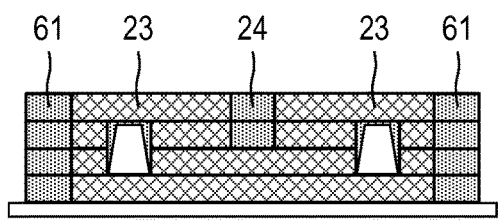
Figure 5K:
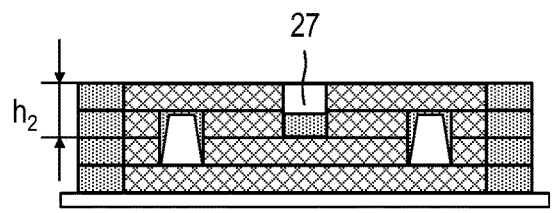
Figure 5L:
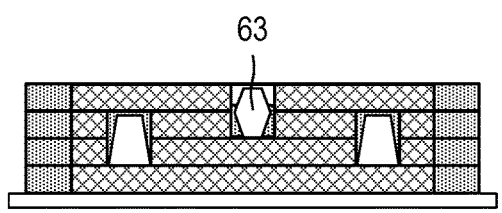
Figure 5M:
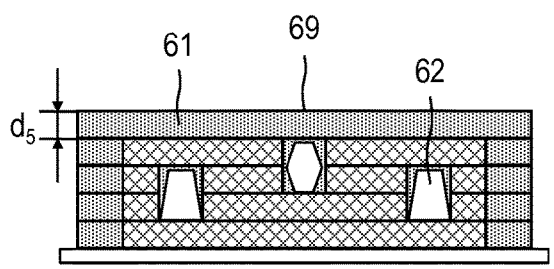
Figure 5N:
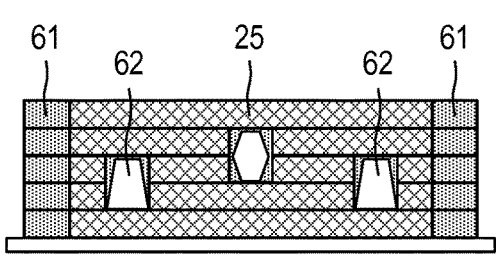
Figure 5O:
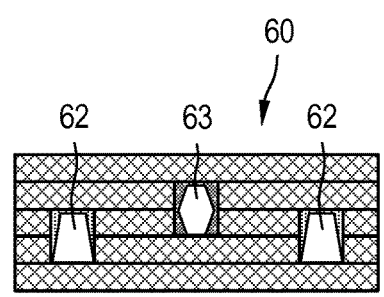

FIGS. 5A through 5O show a second variant of the method according to the present invention for the layered production of a green body 60 from a powdery material 61, including first cutting elements 62 and second cutting elements 63 arranged in a defined manner, green body 60 being referred to as second green body 60. The geometry of second green body 60 corresponds to cuboid 10 shown in FIG. 1, which is segmented in building direction 16 into five cylindrical cross-sectional areas 11, 12, 13, 14, 15 (FIGS. 2A through 2E). Cross-sectional areas 11 through 15 have the layer thickness in parallel to building direction 16 and the cross-sectional area perpendicular to building direction 16. First cross-sectional area 11 includes first material area 17, second cross-sectional area 12 includes second material area 18 and five second setting areas 19, third cross-sectional area 13 includes third material area 21 and nine third setting areas 22, fourth cross-sectional area 14 includes fourth material area 23 and four fourth setting areas 24, and fifth cross-sectional area 15 includes fifth material area 25.

Second green body 60 is constructed in layers with the aid of a building plane 64, a powder feed unit and a print head. A first powder layer 65 of powdery material 61 having first layer thickness $d_1$ is applied with the aid of the powder feed unit (FIG. 5A). The print head applies a first adhesive layer in first material area 17, which binds the loose particles of first powder layer 65 in first material area 17; loose powder particles are situated outside first material area 17 (FIG. 5B). A second powder layer 66 of powdery material 61 having second layer thickness $d_2$ is applied with the aid of the powder feed unit (FIG. 5C). The print head applies a second adhesive layer in second material area 18, which binds the loose powder particles of second powder layer 66 in second material area 18, the powder particles not being bound in second setting areas 19 and outside green body 60 (FIG. 5D). A third powder layer 67 of powdery material 61 having third layer thickness $d_3$ is applied with the aid of the powder feed unit (FIG. 5E). The print head applies a third adhesive layer in third material area 21, which binds the loose powder particles of third powder layer 67 in third material area 21, the powder particles not being bound in third setting areas 22 and outside green body 60 (FIG. 5F).

First insert height $h_1$ of first cavities 26 is reached after the application of the third powder and adhesive layers, so that the placement of first cutting elements 62 into first cavities 26 may take place. The loose powder particles of powdery material 61 are extracted in the area of first cavities 26 with the aid of an extraction unit (FIG. 5G). The two variants may be different: In a first variant, the loose powder particles of powdery material 61 are completely removed from first cavities 26, and in a second variant, the loose powder particles are only partially removed from first cavities 26, part of the loose powder particles remaining in first cavities 26. The choice of the first or second variant depends primarily on the shape of first cutting elements 62 situated in first cavities 26. In processing segments for abrasive processing tools, the cutting elements are mechanically bound in the matrix. It is therefore important that the cutting elements are preferably completely surrounded by the powdery material. Alternatively, a special material, as described in connection with first green body 10, surrounds the cutting elements and ensures a secure mechanical connection.

FIG. 5G shows first cavities 26 of second green body 60, the loose powder particles of powdery material 61 being completely removed. First cutting elements 62 have a geometry without undercuts, so that first cavities 26 may be filled with powdery material 61 or a special material without problems after the placement of first cutting elements 62. The second variant, in which the loose powder particles of powdery material 61 are only partially removed from first cavities 26, is useful, for example, for cutting elements in which first cavities 26 are unable to be filled with powdery material 61 or the special material without problems after the placement of the cutting elements.

After first cutting elements 62 are placed in first cavities 26 (FIG. 5H), the layer construction of second green body 60 continues. A fourth powder layer 68 of powdery material 61 having fourth layer thickness $d_4$ is applied with the aid of the powder feed unit (FIG. 5I). The print head applies a fourth adhesive layer in fourth material area 23, which binds the loose powder particles of fourth powder layer 68 in fourth material area 23, the powder particles not being bound in fourth setting areas 24 and outside green body 60 (FIG. 5J). Second insert height $h_2$ of second cavities 27 is reached after the application of the fourth powder and adhesive layers, so that the placement of second cutting elements 63 into second cavities 27 may take place.

The loose powder particles of powdery material 61 are partially extracted in the area of second cavities 27 with the aid of the extraction unit part of the loose powder particles remaining in second cavities 27 (FIG. 5K). Second cutting elements 63 are subsequently placed in second cavities 27 (FIG. 5L). After second cutting elements 63 are placed in second cavities 27, the layer construction of second green body 60 continues. A fifth powder layer 69 of powdery material 61 having fifth layer thickness $d_5$ is applied with the aid of the powder feed unit (FIG. 5M). The print head applies a fifth adhesive layer in fifth material area 25, which binds the loose powder particles of fifth powder layer 69 in fifth material area 25, the powder particles not being bound outside second green body 60 (FIG. 5N). FIG. 5O shows second green body 60 constructed in layers from powdery material 61, including first and second cutting elements 62, 63 arranged in a defined manner.

FIGS. 6A through 6H show a third variant of the method according to the present invention for the layered production of a green body 80 from a paste-like material 81, including cutting elements 82 arranged in a defined manner, green body 80 being referred to below as third green body 80. The geometry of third green body 80 corresponds to cuboid 10 shown in FIG. 1, which is segmented in building direction 16 into five cylindrical cross-sectional areas 11, 12, 13, 14, 15. Third green body 80 is manufactured in layers with the aid of a device, which includes a building plane 83, a feed unit for paste-like material 81, four material templates and two insert templates. FIGS. 7A through 7F show the material and insert templates used in the third variant of the method according to the present invention for the layered production. A suitable material template and insert template are provided for each different material layer and each different arrangement of cutting elements 82.

Figure 6A:
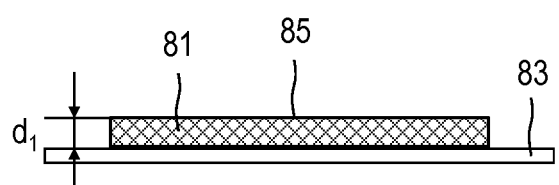
FIGS. 6A through 6H show a third variant of the method according to the present invention for the layered production of a third green body from a paste-like material, including cutting elements arranged in a defined manner.
Figure 6B:
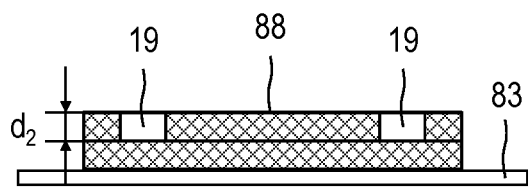
Figure 6C:
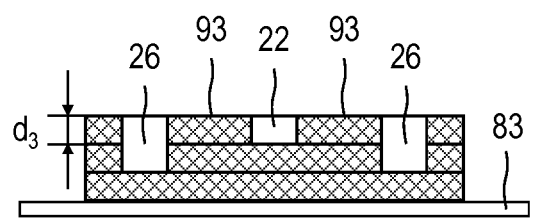

A first material template 84 (FIG. 7A) is situated on building plane 83, and a first material layer 85 of paste-like material 81 having first layer thickness $d_1$ is applied (FIG. 6A). First material template 84 includes a frame 86, which surrounds first material area 17. First material template 84 is removed, a second material template 87 (FIG. 7B) is placed on building plane 83, and a second material layer 88 of paste-like material 81 having second layer thickness $d_2$ is applied to first material layer 85 (FIG. 6B). Second material template 87 includes a frame 89 and five second covering elements 91, second covering elements 91 corresponding to second setting areas 19 of second cross-sectional area 12 and being connected to frame 89. Second material template 87 is removed, a third material template 92 (FIG. 7C) is placed on building plane 83, and a third material layer 93 of paste-like material 81 having third layer thickness $d_3$ is applied to second material layer 88 (FIG. 6C). Third material template 92 includes a frame 94 and nine third covering elements 95, third covering elements 95 corresponding to third setting areas 22 of third cross-sectional area 13 and being connected to frame 94.

Figure 6D:
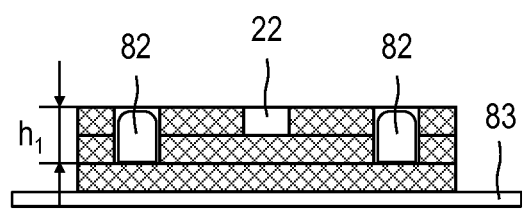
Figure 6E:
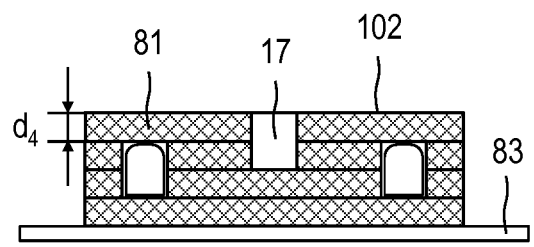

First insert height $h_1$ of first cavities 26 is reached after the application of third material layer 93, so that the placement of cutting elements 82 into first cavities 26 may take place. Third material template 92 is removed, a first insert template 96 (FIG. 7D) is placed on building plane 83, and cutting elements 82 are placed into first cavities 26 with the aid of first insert template 96 (FIG. 6D). First insert template 96 includes a plate 97 having five first openings 98, which correspond to the five first cavities 26. First insert template 96 is removed, a fourth material template 101 (FIG. 7E) is placed on building plane 83, and a fourth material layer 102 of paste-like material 81 having fourth layer thickness $d_4$ is applied to third material layer 93 (FIG. 6E). Fourth material template 101 includes a frame 103 and four fourth covering elements 104, fourth covering elements 104 corresponding to fourth setting areas 24 of fourth cross-sectional area 14 and being connected to frame 103.

Figure 6F:
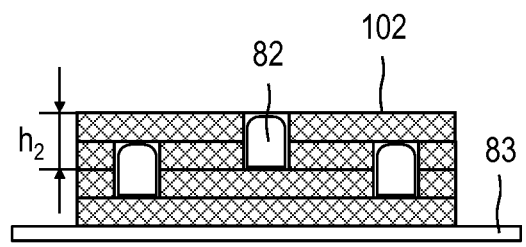
Figure 6G:
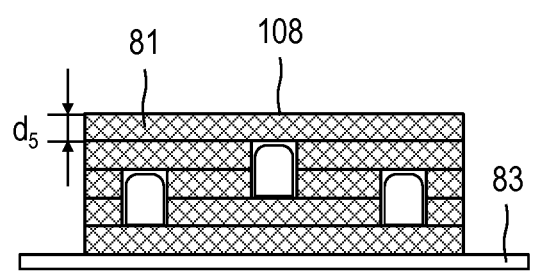
Figure 6H:
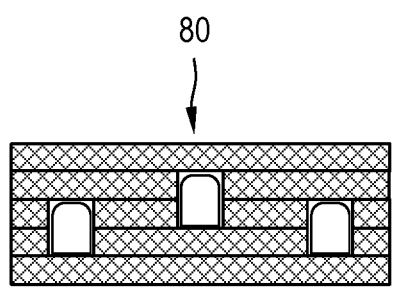
Figure 7A:
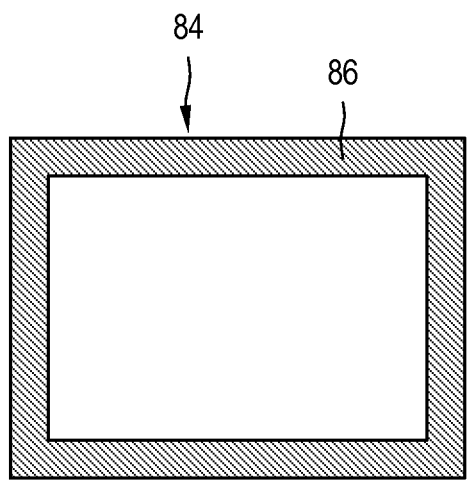
FIGS. 7A through 7F show the material and insert templates used in the third variant of the method according to the present invention for the layered production of the third green body from a paste-like material.
Figure 7B:
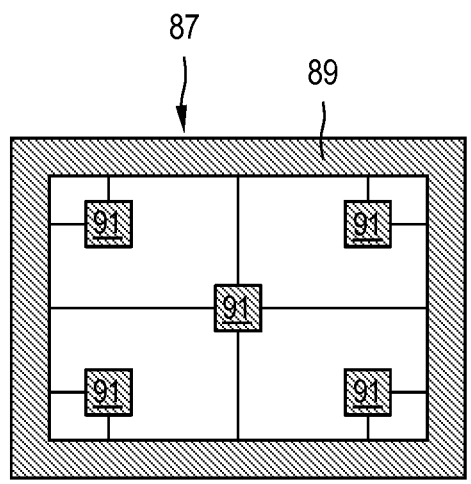
Figure 7C:
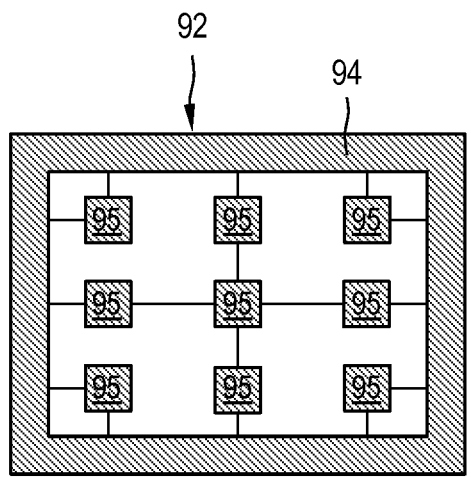
Figure 7D:
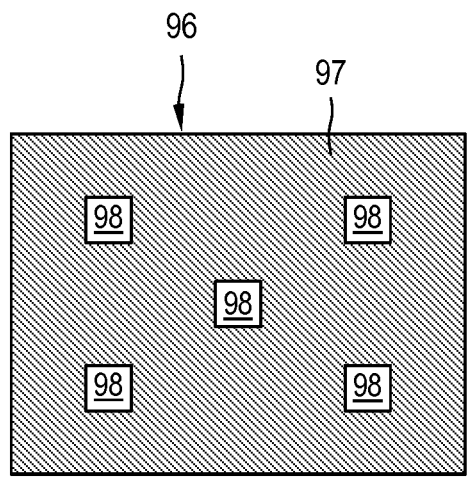
Figure 7E:
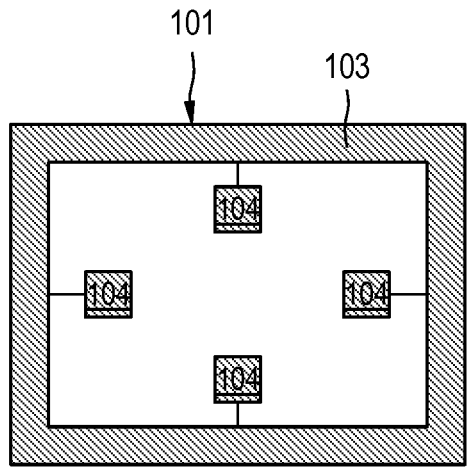
Figure 7F:
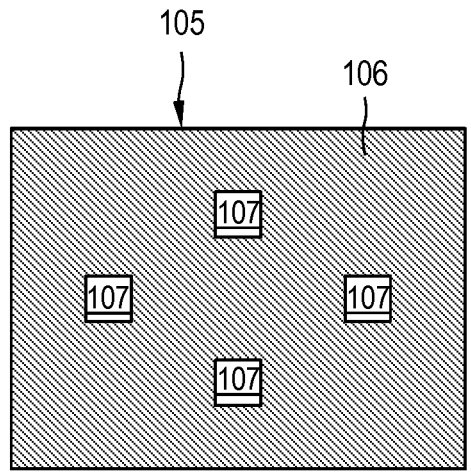

Second insert height $h_2$ of second cavities 27 is reached after the application of fourth material layer 102, so that the placement of cutting elements 82 into second cavities 27 may take place. Fourth material template 101 is removed, a second insert template 105 (FIG. 7F) is placed on building plane 83, and cutting elements 82 are placed into second cavities 27 with the aid of second insert template 105 (FIG. 6F). Second insert template 105 includes a plate 106 having four second openings 107, which correspond to four second cavities 27. Second insert template 105 is removed, a fifth material template is placed on building plane 83, and a fifth material layer 108 of paste-like material 81 having fifth layer thickness $d_5$ is applied to fourth material layer 102 (FIG. 6G). Since first and fifth cross-sectional areas 11, 15 of third green body 80 coincide, the geometry of the fifth material template corresponds to first material template 84. Since layer thicknesses $d_1$, $d_5$ of first and fifth material layers 85, 108 also coincide, first material template 84 and the fifth material template are identical. FIG. 6H shows third green body 80 constructed in layers from paste-like material 81. In a green body in which the first and fifth layer thicknesses are different, the first and fifth material templates are not identical. The geometry of a material template is determined by the cross-sectional surface and the layer thickness.

Cutting elements 82 of third green body 80 may be embedded into a special material, just like cutting elements 42 of first green body 10, the filling of first and second cavities 26, 27 being able to take place in a one-part or two-part filling process. The use of a special material is useful if third green body 80 is subjected to a subsequent processing by hot pressing and/or sintering for compression purposes, and cutting elements 82 become damaged during hot pressing and/or sintering, due to paste-like material 81 used. The special material is selected in such a way that it forms a chemical compound with paste-like material 81 and mechanically binds cutting elements 82.

The invention claimed is:

1. A method for the layered production of a green body from powdery or paste material, cutting elements being arranged in a defined manner and based on three-dimensional data of the green body, the green body being segmented in a building direction into N, N≥2, consecutive cylindrical cross-sectional areas made up of a two-dimensional cross-sectional surface perpendicular to the building direction and a layer thickness parallel to the building direction, the method comprising the steps of:
    dividing the cross-sectional areas of the green body each into material areas manufactured from the powdery or paste material and setting areas, the cutting elements being arranged in the setting areas;
    applying the material areas of one cross-sectional area or the material areas of multiple consecutive cross-sectional areas in the building direction to a building plane arranged perpendicularly to the building direction, until at least one cavity formed by one setting area or multiple consecutive setting areas in the building direction has a necessary insert height for placing the cutting elements; and
    placing at least one cutting element into the cavities having the necessary insert height for placing the cutting elements.

2. The method as recited in claim 1 wherein the necessary insert height of the cavities for placing the cutting elements is less than a minimum diameter of the cutting elements.

3. The method as recited in claim 1 wherein the necessary insert height of the cavities for placing the cutting elements is greater than a maximum diameter of the cutting elements.

4. The method as recited in claim 1 wherein the cavities having the necessary insert height are filled not only with the cutting elements but also with a different material different from the powdery or paste material.

5. The method as recited in claim 4 wherein the filling of the cavities having the necessary insert height with the different material is carried out in one method step.

6. The method as recited in claim 5 the filling of the cavities with the different material is carried out before placing the cutting elements.

7. The method as recited in claim 5 wherein the filling of the cavities with the different material is carried out after placing the cutting elements.

8. The method as recited in claim 4 wherein the filling of the cavities having the necessary insert height with the different material is carried out in two method steps, a first part of the different material being filled into the cavities before placing the cutting elements, the cutting elements being placed into the first part of the special material, and a second part of the different material being filled into the cavities after placing the cutting elements.

9. The method as recited in claim 2 wherein the cutting elements are at least partially fastened in the cavities with the aid of an adhesive.

10. The method as recited in claim 9 wherein the cavities having the necessary insert height are filled with the adhesive before placing the cutting elements.

11. The method as recited in claim 9 wherein the cutting elements are at least partially wetted with the adhesive before the cutting elements are placed into the cavities.

12. A method for the layered production of a green body from powdery material, cutting elements being arranged in a defined manner and based on three-dimensional data of the green body, the green body being segmented in a building direction into N, N≥2, consecutive cylindrical cross-sectional areas made up of a two-dimensional cross-sectional surface perpendicular to the building direction and a layer thickness parallel to the building direction, the method comprising the steps of:
dividing the cross-sectional areas of the green body each into material areas manufactured from the powdery material and setting areas, the cutting elements being arranged in the setting areas;
applying the material areas of one cross-sectional area or the material areas of multiple consecutive cross-sectional areas in the building direction to a building plane arranged perpendicularly to the building direction, until at least one cavity formed by one setting area or multiple consecutive setting areas in the building direction has a necessary insert height for placing the cutting elements; and
placing at least one cutting element into the cavities having the necessary insert height for placing the cutting elements.

13. A method for the layered production of a green body from paste material, cutting elements being arranged in a defined manner and based on three-dimensional data of the green body, the green body being segmented in a building direction into N, N≥2, consecutive cylindrical cross-sectional areas made up of a two-dimensional cross-sectional surface perpendicular to the building direction and a layer thickness parallel to the building direction, the method comprising the steps of:
dividing the cross-sectional areas of the green body each into material areas manufactured from the paste material and setting areas, the cutting elements being arranged in the setting areas;
applying the material areas of one cross-sectional area or the material areas of multiple consecutive cross-sectional areas in the building direction to a building plane arranged perpendicularly to the building direction, until at least one cavity formed by one setting area or multiple consecutive setting areas in the building direction has a necessary insert height for placing the cutting elements; and
placing at least one cutting element into the cavities having the necessary insert height for placing the cutting elements.

* * * * *